(12) United States Patent
Bitterolf et al.

(10) Patent No.: US 10,007,280 B2
(45) Date of Patent: Jun. 26, 2018

(54) APPARATUS AND METHOD FOR CONTROLLING AND REGULATING A MULTI-ELEMENT SYSTEM

(71) Applicant: SIEMENS AKTIENGESELLSCHAFT, München (DE)

(72) Inventors: David Bitterolf, Erlangen (DE); Jens Hamann, Fürth (DE); Carsten Hamm, Erlangen (DE); Sven Tauchmann, Chemnitz (DE)

(73) Assignee: Siemens Aktiengesellschaft, München (DE)

( * ) Notice: Subject to any disclaimer, the term of this patent is extended or adjusted under 35 U.S.C. 154(b) by 436 days.

(21) Appl. No.: 14/734,747

(22) Filed: Jun. 9, 2015

(65) Prior Publication Data
US 2015/0355647 A1    Dec. 10, 2015

(30) Foreign Application Priority Data

Jun. 10, 2014 (EP) .................................. 14171752

(51) Int. Cl.
  *G05D 17/02* (2006.01)
  *G05B 13/04* (2006.01)
  *B25J 9/16* (2006.01)

(52) U.S. Cl.
  CPC ............ *G05D 17/02* (2013.01); *B25J 9/1638* (2013.01); *G05B 13/04* (2013.01);
  (Continued)

(58) Field of Classification Search
  CPC ....... G05D 17/02; B25J 9/1638; G05B 13/04; G05B 2219/39319; G05B 2219/39176; G05B 2219/39194
  (Continued)

(56) References Cited

U.S. PATENT DOCUMENTS 5,357,424 A * 10/1994 Kakizaki ............... B25J 9/1653
                                                              700/254
5,742,138 A *  4/1998 Kato ..................... B25J 9/1687
                                                              318/568.17
(Continued)

FOREIGN PATENT DOCUMENTS

DE     102007024143 A1    11/2008
DE     102011111758 A1     2/2013
(Continued)

OTHER PUBLICATIONS

Ohnishi Kouhei et al: "Motion Control for Advanced Mechatronics" IEEE/ASME Transactions on Mechatronics, vol. 1, No. 1, US, pp. 2-13E; 1996.

*Primary Examiner* — Christopher E Everett
(74) *Attorney, Agent, or Firm* — Henry M. Feiereisen LLC (57) ABSTRACT

An apparatus for controlling and regulating a movement of a system includes a load calculating device calculating continuously during the movement of the system a respective force vector for each of the individual elements as a function of predetermined reference coordinates and a torque calculating device calculating continuously during the movement at least one compensating variable, wherein the compensating variable compensates the force vectors as a function of the reference coordinates and the force vectors. The apparatus for controlling and regulating has a control unit controlling continuously during the movement a force-producing variable for the at least one drive as a function of the reference and the at least one compensating variable.

11 Claims, 6 Drawing Sheets

(52) U.S. Cl.
CPC .............. *G05B 2219/39176* (2013.01); *G05B 2219/39194* (2013.01); *G05B 2219/39319* (2013.01)

(58) Field of Classification Search
USPC ........................................................ 700/275
See application file for complete search history.

(56) References Cited

U.S. PATENT DOCUMENTS

| | | | | |
|---|---|---|---|---|
| 6,470,225 | B1* | 10/2002 | Yutkowitz | G05B 11/28 700/188 |
| 8,803,465 | B1* | 8/2014 | Smith | G05B 11/30 318/570 |
| 2004/0093119 | A1* | 5/2004 | Gunnarsson | B25J 9/1638 700/245 |
| 2004/0128030 | A1* | 7/2004 | Nagata | B25J 9/1633 700/245 |
| 2004/0249319 | A1* | 12/2004 | Dariush | A61H 1/00 601/5 |
| 2008/0058982 | A1* | 3/2008 | Gray | B25J 9/1602 700/159 |
| 2010/0198405 | A1* | 8/2010 | Hacker | B25J 9/1641 700/251 |
| 2011/0087374 | A1 | 4/2011 | Ando | |
| 2011/0270443 | A1 | 11/2011 | Kamiya | |
| 2012/0253505 | A1* | 10/2012 | Matsushita | G05B 19/401 700/193 |
| 2013/0184869 | A1* | 7/2013 | Inazumi | B25J 9/1633 700/260 |
| 2014/0289703 | A1* | 9/2014 | Mueller | G06F 8/30 717/121 |
| 2014/0379126 | A1* | 12/2014 | Ueberle | B25J 9/1674 700/245 |
| 2015/0057798 | A1* | 2/2015 | Meissner | B25J 9/1638 700/250 |

FOREIGN PATENT DOCUMENTS

| | | |
|---|---|---|
| EP | 1980374 A2 | 10/2008 |
| EP | 2492062 A2 | 8/2012 |
| JP | H11104985 A | 4/1999 |
| JP | 2011152599 A | 8/2011 |
| JP | 2011230234 A | 11/2011 |
| JP | 2011230238 A | 11/2011 |
| JP | 2011230257 A | 11/2011 |
| WO | WO 2009034957 A1 | 3/2009 |

* cited by examiner

APPARATUS AND METHOD FOR CONTROLLING AND REGULATING A MULTI-ELEMENT SYSTEM

CROSS-REFERENCES TO RELATED APPLICATIONS

This application claims the priority of European Patent Application, Serial No. EP14171752, filed Jun. 10, 2014, pursuant to 35 U.S.C. 119(a)-(d), the disclosure of which is incorporated herein by reference.

BACKGROUND OF THE INVENTION

The present invention relates to an apparatus for controlling and regulating a movement of a system including a plurality of individual elements which cooperate kinematically, at least one thereof being a drive. The present invention further relates to a method for controlling and regulating a movement of such a system. Such a system is understood, for example, as equipment, a machining tool, a processing machine and, in particular, also a robot or a machine tool. The drive is, for example, an electric motor or a hydraulic or pneumatic drive.

The following discussion of related art is provided to assist the reader in understanding the advantages of the invention, and is not to be construed as an admission that this related art is prior art to this invention.

Mechanical systems of this type are widely used in manufacturing. An important prerequisite for achieving good results in terms of quality is the absolute precision of these manufacturing means. However, external interfering forces (for example gravitational force, process force, friction, load change, etc.) act on the mechanical structures, said forces potentially leading to deviations at the so-called "TCP" (Tool Center Point) due to the resilience of the joints and components (hereinafter also called individual elements). The positional dependency of the deviation at the TCP is in some circumstances very high due to the interfering forces. Thus, for example, a robot arm in the extended state is pulled further down at the free end than in the retracted or angled state. The absolute static precision is a measurement thereof.

Hitherto, in the case of controlled axes, this problem of absolute static precision has been resolved by a second direct measurement system being used on the load side in the vicinity of the TCP. The position of the motor and/or drive is adapted via the position control circuit to a sufficient extent that the required compensation force is transmitted to the structure via the drive train suspension. The use of a second measurement system is associated with considerable additional hardware costs and requires a complex adaptation of the structure in order to install the measurement system.

A further approach for improving the absolute static precision is to measure, relative to a reference position, the deviation at the TCP in a plurality of points of the working area and to add this value as a compensation value to the reference value channel and/or to subtract this value from the actual value channel. The drawback with this method is the effort and costs required for the measurement of the working area and/or of the robot/machine. The measurement of the deviations requires the equipment to be provided with external measuring means. The measuring pattern is established on a case-by-case basis. The analysis has to be repeated in each piece of equipment of the same construction. The correction values stored in tabular form are additionally load-dependent, i.e. they apply specifically to one loading case. If the loading changes, for example, the values no longer apply.

To this end, a robot control is disclosed in the publication EP 1 980 374 A2 in which an absolutely precise model is stored for controlling an industrial robot. At the start point and end point of the movement, therefore, interfering forces for the positioning are taken into account in the respective steady-state system.

A further important feature is the so-called "quasi-static precision". During the acceleration phase the motor force and counter force act equally in one joint. The counter force is based on a structure which is not infinitely rigid and may in any case cause parasitic movements at the TCP. If a robot arm, for example, has a plurality of members which in each case are able to be moved relative to one another by means of a motor (a member with an associated drive and/or motor represents an axis of movement, abbreviated to "axis") the movement, in particular an acceleration, of the one member may have an effect on the other member, whereby the quasi-static precision is affected. To this end, the parasitic movement produced in machine tools due to an acceleration of the control axis has hitherto been compensated by a compensating value applied as a reference position value.

During the rotational movement of an axis, the torque is frequently controlled by so-called torque pilot control. The parameterization of the torque pilot control requires the input of the axial moment of inertia relative to the motor. However, in industrial robots this value is not constant over the working area, due to the construction. The total inertia relative to the motor is a function of the joint position. To calculate a reference torque value the motor acceleration has hitherto been multiplied by a predetermined value of the axial inertia.

The parameterization of the maximum axial acceleration is carried out as a result of the design of the motor and the power output component and is derived relative to the axis from the maximum permitted current and the axial inertia. As the maximum acceleration has to be recorded as a constant value, for the parameterization thereof only the point where the axial inertia relative to the motor reaches its maximum is relevant. As a result, in the regions where this value is not reached, the current reserve is not utilized and a higher acceleration limit would theoretically be possible. Therefore, in some circumstances it could be desirable to calculate an acceleration reserve for each position and/or an adaptation of the acceleration limit for greater exploitation of the current limit. Position-dependent acceleration limits have hitherto not been considered in the path planning.

In particular in industrial robots, the mobility and flexibility of the operating means is highly valued. However, this requires structural boundary conditions which make the robot into a structure which is highly susceptible to vibrations. Due to the absence of measuring options an electrical damping of these vibrations is not possible. A portion of the excitation results directly from the command variables. Therefore the command behavior should be correspondingly adapted according to the vibrations. One possible remedy is to moderate the frequency content of the travel profiles by reducing the jerk so that natural resonances are no longer excited. The drawback with this method is the necessary restriction of the axial dynamics which can be considerable.

Due to the movement transformation which can be complex and the resulting compensation movements, it is no small task to identify the risk of collisions in advance. Monitoring the measurement signals (for example the motor current) is also not possible due to the loading which can be highly variable. Thus improved monitoring of collisions might be desirable. In hitherto known solutions to this problem, the motor currents calculated by means of a model are compared with the actually measured motor currents, and when the deviations are inadmissibly high the machine/robot is stopped. Such a system is disclosed, for example, in the publication EP 1 403 746 B1.

An apparatus and a method for controlling and regulating a movement of a system comprising a plurality of individual elements which cooperate kinematically, at least one thereof being able to be moved by a drive, is disclosed in the publication DE 10 2007 024 143 A1. Force values identifying the robot are continuously calculated during the movement of the system. Moreover, a compensatory compensating variable based on reference coordinates is also continuously calculated during the movement of the system. A force-producing variable for the at least one drive is controlled continuously during the movement depending on the reference coordinates and the at least one compensating variable.

It would therefore be desirable and advantageous to provide an apparatus for controlling and regulating and a corresponding method for controlling and regulating a movement of a system, comprising a plurality of individual elements which cooperate kinematically, in which the movement of the system per se may be performed more precisely.

SUMMARY OF THE INVENTION

According to one aspect of the present invention an apparatus for controlling and regulating a movement of a system which includes a plurality of individual elements which cooperate kinematically, with at least one of the individual elements being movable by a drive, includes a load calculating device calculating continuously during the movement of the system a respective force vector for each of the individual elements as a function of predetermined reference coordinates; a torque calculating device calculating continuously during the movement at least one compensating variable as a function of the predetermined reference coordinates and the force vector, said compensating variable compensating the respective force vectors, a control unit controlling continuously during the movement a force-producing variable for the at least one drive as a function of the reference coordinates and the at least one compensating variable; and a model of a control path of the system, wherein the model is configured to calculate at least one ideal command variable for the drive or an ideal torque of the drive for monitoring an actual torque of the drive.

According to another aspect of the present invention a method for controlling and regulating a movement of a system comprising a plurality of individual elements which cooperate kinematically, at least one thereof being moved by a drive, wherein the method includes the steps of calculating with a load calculating device continuously during the movement of the system a respective force vector for each of the individual elements as a function of predetermined reference coordinates; calculating a torque calculating device continuously during the movement of the system at least one compensating variable compensating the force vectors based on the reference coordinates and the force vectors; controlling a control unit controlling continuously during the movement of the system a force-producing variable for the at least one drive depending on the reference coordinates and the at least one compensating variable; and calculating with a model at least one ideal command variable for the drive or an ideal torque of the drive of a control path of the system, for monitoring an actual torque of the drive.

In the case of an electric motor as a drive, the force-producing variable is the electric current while in a hydraulic or pneumatic drive the force-producing variable is the pressure.

Advantageously, therefore, the movement of the system is continuously dynamically controlled. Therefore, during the movement, force vectors and corresponding compensating variables are continuously recalculated so that a predetermined movement path may be more accurately maintained. Precisely maintaining the movement paths is necessary in many manufacturing tasks but not in most pick-and-place tasks in which the known solutions according to EP 1 980 374 A2 are sufficient.

The compensating variable may be a compensating torque, a compensating force, a compensating speed or a compensating position. Thus each of these variables may be used individually or in combination with one another for the compensation. With cascaded control, a control using the compensating torque as the compensating variable leads to a more rapid compensation of the interfering forces. A control using the compensating position as the compensating variable leads to a more accurate compensation of the interfering forces.

According to another advantageous feature of the invention, the load calculating device uses a load model for calculating the respective force vector, in which a point and/or direction and/or amplitude of an introduction of force in one of the individual elements is/are considered. In this manner, the introduction of force may be considered dynamically with all of its parameters during a movement.

According to another advantageous feature of the invention, the control unit has a cascaded position control, speed control and current control (and/or control of the force-producing variable). As a result, the movement of the system may be accurately controlled in all details.

According to another advantageous feature of the invention, the torque calculating device uses a multi-element model for calculating the at least one compensating torque, in which a mass and/or a resilience and/or a damping and/or a linear dependence on degrees of freedom of each of the respective individual elements is/are considered. In this manner, all or the most important mechanical variables may be considered when modeling the system.

Specifically, the multi-element model may be based on a linear differential equation system. This has the advantage that it may be achieved without high computing costs.

According to another advantageous feature of the invention, the differential equation system is based on a mass matrix, a damping matrix and a stiffness matrix, in each case relative to the individual elements. Thus the essential mechanical variables such as mass, damping and stiffness are incorporated in the multi-element model.

Moreover, inertial forces (optionally also the Coriolis force) and/or centrifugal forces which respectively act on the individual elements may be considered in the multi-element model. As a result, in particular the quasi-static precision of the movement may be increased.

According to another advantageous feature of the invention, the torque calculating device is configured to continuously calculate during the movement a maximum acceleration of one of the individual elements or a combination of a plurality of individual elements. This has the advantage that in each position the acceleration limit may be adapted for greater exploitation of the current limit and/or pressure limit.

According to another advantageous feature of the invention, the torque device and the control unit are configured to continuously reduce the excitation of at least one natural frequency of the system during the movement. This means that the natural frequencies are excited to a lesser extent which leads to improved motion behavior of the system.

According to another advantageous feature of the invention, the apparatus for controlling and regulating may include a model of the control path of the system, wherein the model is configured to calculate at least one ideal command variable for the drive. Thus a definable dynamic for the axes may be predetermined.

According to another advantageous feature of the invention, the apparatus for controlling and regulating may include a model of the control path of the system, wherein the model is configured to calculate an ideal torque of the drive calculated for monitoring an actual torque of the drive. With such a model of the control path, for example, drive torques of the actual system may be monitored, whereby information may be obtained about collisions.

The wider functions set forth above in connection with the apparatus for controlling and regulating according to the invention may also be integrated as method steps in the method according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
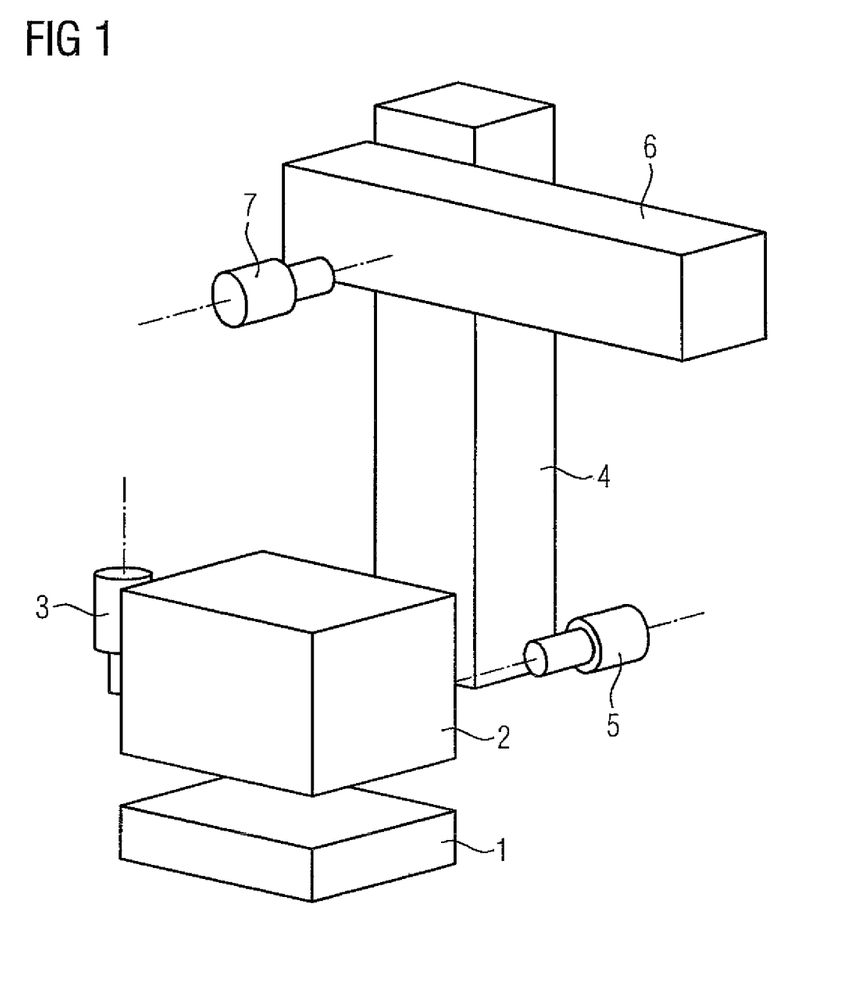
FIG. 1 shows a graphical representation of a model of an industrial robot.

For a system of any design (machine, equipment, etc.) of the type mentioned in the introduction, in particular a robot or a machine tool, an apparatus may be used for controlling and regulating the movement of its plurality of individual elements which cooperate kinematically. An example of such a multi-element system is shown in FIG. 1. Here components of a robot are shown symbolically. This robot is located, for example, on a base plate 1. A robot element 2 may rotate on a vertical axis via the base plate 1. The rotation takes place by means of a motor 3. Although the following examples refer to an electric motor as the drive, in each case a further drive may also be used. In hydraulic and pneumatic drives, therefore, the pressure is the standard variable instead of the current.

The robot element 2 together with the motor 3 represents a motion axis (abbreviated to axis). A first arm 4 is rotatably mounted on the robot element 2 by means of a motor 5. A second arm 6 is also rotatably mounted on the distal end of this first arm 4 by means of a further motor 7. The robot, therefore, has in this case three axes, the first axis thereof being formed with the individual element 2 (optionally including the motor 3), the second axis being formed with the individual element 4 (optionally including the motor 5), and the third axis being formed with the individual element 6 (optionally including the motor 7).

When at least one of these axes moves, this is referred to here as a movement of the system. Each axis and/or each individual element respectively has its own individual mass, damping, stiffness, etc. This has the result that, for example, the gravitational force or a process force acts differently on the system, depending on the position in which the axes are located relative to one another. If, for example, a force pulls downwardly at the tip of the second arm 6 illustrated horizontally in FIG. 1, this has a different effect on the absolute position of the tip of the second arm 6 than if the second arm 6 were oriented, for example, vertically upward. Each force acting on the system, therefore, has an effect which in each case is dependent on the position of all of the axes.

The behavior of the system may be described in a multi-element model which represents a three-dimensional, mechanical MIMO model (multiple input, multiple output).

An apparatus for controlling and regulating (this and the following also expediently apply to a corresponding method) according to the present invention for controlling a movement of a system such as the robot of FIG. 1 is based on such a multi-element model. The model is preferably a three-dimensional, linear multi-element model. Components of this model are physical and geometric variables, such as:

mass properties of the individual elements and mass behavior in space, resilience of the joints and drive trains; optionally the resilience of the elements could be included, linear damping properties of the spring elements, geometric constraints and/or linear dependencies between individual degrees of freedom and definition of the joints (type, position and alignment).

Both the static and the dynamic transmission behavior between inputs and outputs may be described by means of the following linear differential equation system:

$$M\ddot{X} + D\dot{X} + KX = T^T f$$

In this case M indicates the mass matrix, D the damping matrix, K the stiffness matrix and T the rectangular transformation matrix, which shows the relationship between the state variables X and all degrees of freedom of the model. Each individual element of the system (see reference numerals 1, 2, 4 and 6 of FIG. 1) is per se rigid and has exactly six degrees of freedom (three translational and three rotational). The vector f is the vector of the external forces at the center of gravity of the respective individual element. This force vector thus contains, for example, for each individual element the gravitational force and optionally a process force and the like (for example a force which is produced by pressing a tool against a workpiece). The state vector X describes the small movements about the original operating point. Thus the matrices M, D, K and T are independent of the state variables. The joint position is not a state variable but a further parameter for calculating the matrices M, D, K and T.

The model is preferably a linear multi-element system in which the positional dependency of the system behavior is considered. Improved absolute precision may be achieved by motor forces being introduced at any time for compensating all of the interfering forces. A state of balance results therefrom in which the small deviations at the TCP are zero.

An important prerequisite for calculating the motor torque is accurate information about the loading case. The description of the loading case contains information about the point(s), the direction(s), and the amplitude(s) of the introduction of force. In addition to the aforementioned interfering forces, processing forces may also be introduced as force, said forces for example being produced during milling or drilling.

The motor torques and the positions of the individual elements (for example robot arms) are thus a solution of the following static equation system:

$$KX = T^T(f_{Load} + f_{Mot}),$$

wherein the state vector X and the motor forces $f_{Mot}$ are unknown. As this equation system is under-determined it has to be supplemented by a constraint for the coordinates of the TCP, namely $$\begin{cases} KX = T^T(f_{Load} + f_{Mot}) \\ T_{TCP}X = 0 \end{cases}$$

The matrix $T_{TCP}$ is an extract from the matrix T and describes the linear dependency between the coordinates of the TCP and the state variables. An important prerequisite for the ability to solve the problem is that all TCP coordinates declared as zero are able to be moved by the motors. This is the case, however, in all machine kinematics and robot kinematics considered here. The robot, therefore, also has to be able to move the respective tool in the desired direction.

The transmission of the motor torque to the mechanical structure requires the drive train suspension to be mounted by an angular offset on the motor. This angular offset is derived from the state vector X and has to be considered when generating the reference value.

Figure 2:
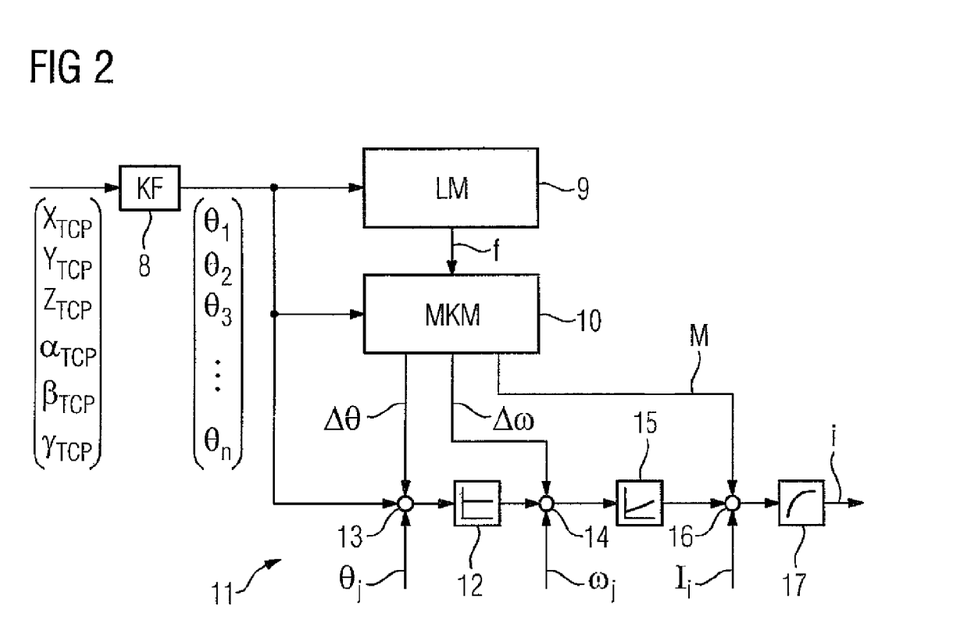
FIG. 2 shows a structural overview of a compensation of the interfering force.

FIG. 2 shows the structure of a method and/or a corresponding apparatus for controlling and regulating for compensating for interfering forces. Reference coordinates for the TCP, namely $X_{TCP}$, $Y_{TCP}$ and $Z_{TCP}$ and $\alpha_{TCP}$, $\beta_{TCP}$, $\gamma_{TCP}$, are predetermined by a master unit. A coordinate transformation (KF) into joint coordinates $\theta_1$ to $\theta_n$ takes place in a transformation unit 8, wherein n is a natural number, for example n=6. In a load model 9 (LM; optionally implemented as a load calculating device) a force vector f is determined for the respective joint coordinates depending on a point, a direction and an amplitude of the introduction of force. This is preferably carried out for each individual element of the system.

A multi-element model 10 (MKM; optionally implemented as a torque calculating device) processes the force vectors and/or the force vector f. Based thereon and based on the joint coordinates, one respective motor torque and/or a corresponding equivalent current for the respective motor of each axis is calculated. Moreover, in the multi-element model 10 angular offsets $\Delta\theta$ are also calculated here. In these calculations the mass properties, the resilience, the damping and linear dependencies of the degrees of freedom of the respective axes and/or individual elements are considered. Preferably, the multi-element model 10 is based on the second-order linear differential equation system which has been proposed above.

A control unit 11 arranged downstream of the multi-element model 10 determines from the joint coordinates $\theta_1$, $\theta_2$, $\theta_3$, ..., $\theta_i$, ..., $\theta_n$, the angular offsets $\Delta\theta$ and the motor torques M, a current i for activating a motor, not shown in FIG. 2, of one of the axes of the system, whereby the parasitic movement due to interfering forces is reduced or compensated. The control unit preferably has a cascaded position control, speed control and current control. For the position control, a position controller 12 (preferably a P-controller) is provided which contains as the input variable a sum, using the correct arithmetic sign, of the joint coordinates $\theta_1$ to $\theta_n$, the angular offsets $\Delta\theta$ and the actual coordinates $\theta_j$.

The control variable of the position controller 12 serves as an input variable for a speed control arranged downstream, wherein an actual angular speed $\omega_j$ is added to this input variable in an adder 14 using the correct arithmetic sign. The summated signal is supplied to a speed controller 15 (preferably a PI-controller).

The output signal of the speed control and/or the speed controller 15 serves as an input variable for a current control. One respective motor torque M and/or a corresponding equivalent is added to this input variable in an adder as well as an actual current $I_j$ in an adder 16, using the correct arithmetical sign. This adder 16 and the other two adders 13 and 14 (generally: logic elements) optionally have a calculating and/or amplifying function in order to obtain the respectively desired variable, for example by multiplication. The output signal of the adder 16 is supplied to a current controller 17 which emits the control variable for the motor, namely the current i.

For the sake of clarity, in FIG. 2 an interfering force compensation is only shown for a single axis. Corresponding calculations and controls, however, are preferably carried out for all axes of the system. In the simplest case, therefore, individual current values, by which the respective motors are activated, are calculated for each axis. The multi-element model 10, therefore, may be used to compensate for static interfering forces from known loading cases by motor forces during the entire movement, i.e. continuously for the current coordinates and the current actual values.

Moreover, the multi-element model may be used in order to compensate for quasi-static loading cases and acceleration processes. The acceleration of one axis and the counter force produced thereby in the joint may optionally lead to parasitic movements at the TCP due to the flexibility of the structure. If, for example, an accelerated axis is supported on a second axis, the second axis alters its position or inclination due to its finite stiffness. Such and similar parasitic movements may be compensated by means of compensating movements of the remaining axes. In this case the calculated compensating movement is pilot-controlled as rotational speed and torque. Such a pilot control is shown for n axes A1, A2, ..., Ai, ..., An in FIG. 3. The control structure is based on that of FIG. 2. The same elements are provided with the same reference numerals. Hereinafter only the differences are set forth.

Figure 3:
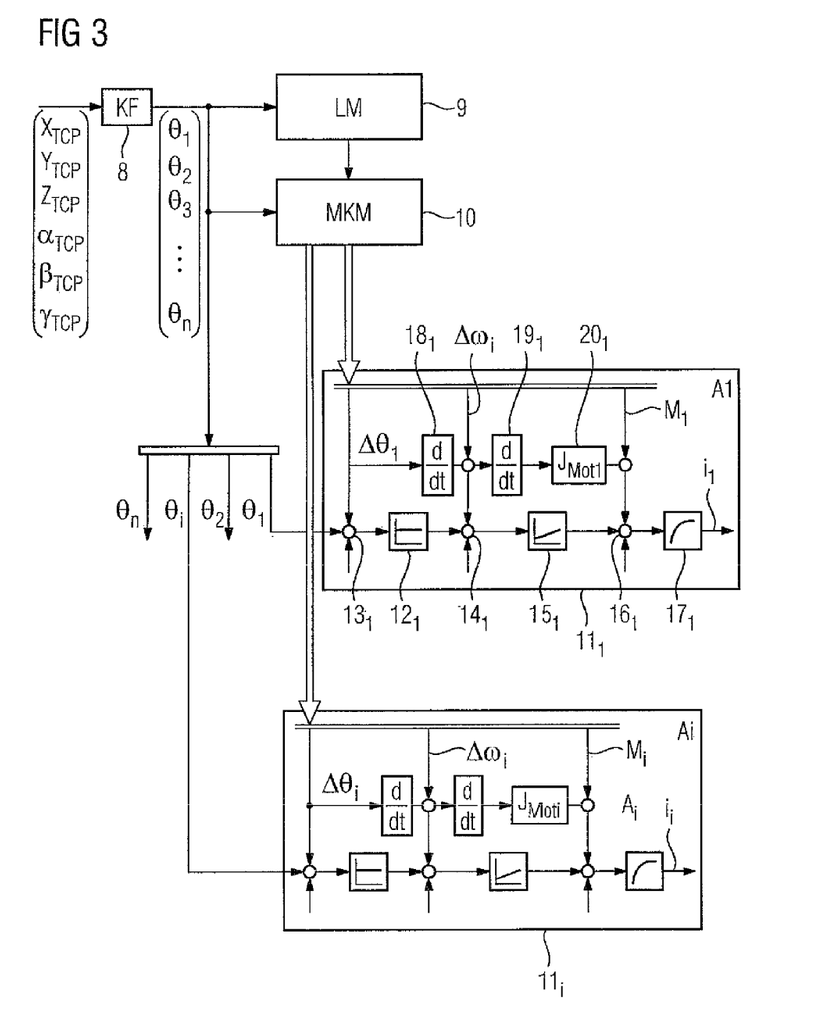
FIG. 3 shows a structural overview of a compensation of the parasitic movement produced due to a quasi-static force.

As already mentioned, for the sake of clarity only the control unit 11 for a single axis is shown in FIG. 2. In FIG. 3, for two selected right-angled axes A1 and Ai from A1 to An, the respective control unit $11_1$ and $11_i$ from $11_1$ to $11_n$ is shown. The control unit $11_1$ obtains as input variables the joint coordinates $\theta_1$ from the transformation unit 8 and the angular offset $\Delta\theta_1$, a speed offset $\Delta\omega_1$ as well as a compensating torque $M_1$ from the multi-element model 10. In the same manner, the control unit $11_i$ obtains the joint coordinates $\theta_i$ from the transformation unit 8 and the angular offset $\Delta\theta_2$, a speed offset $\Delta\omega_1$, as well as a compensating torque $M_i$ from the multi-element model 10.

All n control units $11_1$ to $11_n$ are of the same construction. Therefore, only the first control unit $11_1$ is described in detail here. It is based on the control unit 11 of FIG. 2, reference being made once again to the description thereof. Accordingly, this results in the position controller $12_1$, the speed controller $15_1$ and the current controller $17_1$, as well as the adders $13_1$, $14_1$ and $16_1$. In the control unit $11_1$ additionally a first differentiator $18_1$ is provided here by which an additional command variable is determined from the angular offset $\Delta\theta_1$ by considering the speed offset $\Delta\omega_1$ for the speed control, wherein this command variable is considered in the adder $14_1$. By means of a second differentiator $19_1$, this further speed command variable is converted into an acceleration variable and subsequently multiplied in a multiplier $20_1$ with a total axial inertia $J_{Mot1}$. The resulting value is finally provided to the adder $16_1$ by considering the compensating torque $M_1$. Finally, the current signal $i_1$ results for activating the first axis. In a similar manner the current signal $i_i$ are produced in the control unit $11_i$. In this manner, parasitic movements which are produced due to a quasi-static force are compensated by corresponding compensating movements.

Moreover, for each position the axial inertia relative to the respective motor may be calculated from the multi-element model 10. The axial inertia is to this end determined from the modal mass associated with the rigid element mode (natural frequency 0 Hz). This rigid element mode is purely theoretical and denotes a movement without any vibration. For the calculation, therefore, in each case only one motor has to move freely. The remaining axes are in this case clamped. For calculating the modal mass, it is sufficient only to identify the characteristic vector associated with the rigid element mode. The pseudo inversion of the characteristic vector is insignificant and is less onerous for the calculation process than the inversion of a complete matrix.

The determination of the characteristic vector associated with the rigid element mode may take place in a simple manner, without considering the remaining characteristic values and vectors. The methodology is explained by the example of any quadratic matrix A. For the matrix A, the characteristic values $\lambda$ and the associated characteristic vectors $X_\lambda$ are the solutions of the following equation system:

$$AX_\lambda = \lambda X_\lambda$$

For the cited object of the invention it may be assumed that the matrix A has only one single rigid element mode. This means that for $\lambda=0$ the solution space is a one-dimensional vector space. The determination of the base vector requires the solution of a simple equation system:

$$AX_\lambda = 0$$

The solution of the linear equation system may, for example, be optimized by means of the algorithm "characteristic". The result is the desired characteristic vector $X_\lambda$ $$X_\lambda = \begin{pmatrix} x_1 \\ x_2 \\ \vdots \\ x_j \\ \vdots \\ x_n \end{pmatrix}$$

For calculating the modal masses the pseudo-inverse vector $X_{i\lambda}$ is required. The vector may be constructed from elements. $X_i$ fulfills the following condition: $X_{i\lambda}{}^T X_\lambda = 1$.

$$X_{i\lambda} = \frac{1}{n_0}\begin{pmatrix} x_{i1} \\ x_{i2} \\ \vdots \\ x_{ij} \\ \vdots \\ x_{in} \end{pmatrix} \text{ wherein } \forall j, \begin{cases} x_{ij} = \frac{1}{x_j} & \text{for } x_j \neq 0 \\ x_{ij} = 0 & \text{otherwise} \end{cases}$$

And $n_0$ is the number of elements of the vector $X_\lambda$ unequal to zero.

For determining the modal mass, the matrix is derived from the following differential equation system, the rigid element mode thereof being sought (A):

$$\begin{cases} M\ddot{X} + KX = 0 \\ X_{red} = T_j X \end{cases}$$

wherein M and K correspond to the mass and stiffness matrices of the system with free motors. $T_j$ is the transformation matrix which corresponds to the constraints, whereby all motors and/or axes, apart from the Hype, are clamped. The reduced vector $X_{red}$ contains only the state variables of those degrees of freedom which the structure has due to the joints, while the state vector X has all degrees of freedom. As the rigid element mode is not assigned any modal damping, the damping matrix may be derived from the equation system.

The equation system for determining the characteristic vector is in this case:

$$(T_j M T_j^T)^{-1} T_j K T_j^T X_\lambda = 0$$

The total inertia is derived from the calculated variables:

$$J_{\Sigma_j} = X_{i\lambda}{}^T T_j M T_j^T X_\lambda = 0$$

Figure 4:
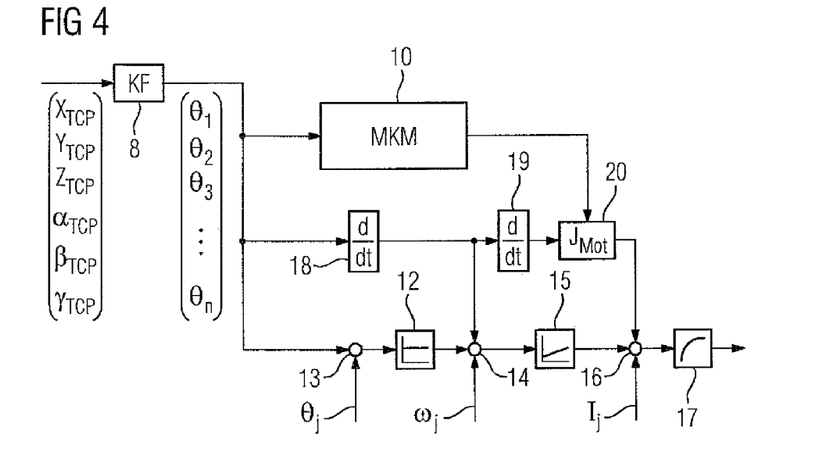
FIG. 4 shows a structural overview of the pilot torque control.

To this end, FIG. 4 shows a basic outline of the structure of the torque control. The coefficient $J_{Mot}$ is the total axial inertia relative to the motor for the relevant axis. This is considered in the control unit 11, which structurally corresponds to the control unit $11_1$ of FIG. 3, in the multiplier 20 which forms the additional command variable for the adder 16. The remaining elements of the control unit 11 also correspond to those of the control unit $11_1$ of FIG. 3 and are only shown in FIG. 4 without the index "1". For the sake of clarity, moreover, in FIG. 4 the view of the load model 9 is dispensed with, although it is naturally present. The same applies to the following FIGS. 5 and 6.

The multi-element model may, therefore, be used for each position to calculate the axial inertias $J_{Mot}$ relative to the motors for parameterization of the torque pilot control. Therefore, the multi-element model 10 in FIG. 4 has a specific output which delivers a signal to the multiplier 20 for adapting the axial inertias $J_{Mot}$.

The above multi-element model which is preferably based on the cited linear differential equation system, as has been set forth above, may be used for calculating the axial inertias for each position, relative to the respective motors. Thus in an optionally enhanced model, maximum axial accelerations may be determined therefrom. The respective current maximum axial acceleration during the movement of the system always affects the path of the movement.

Figure 5:
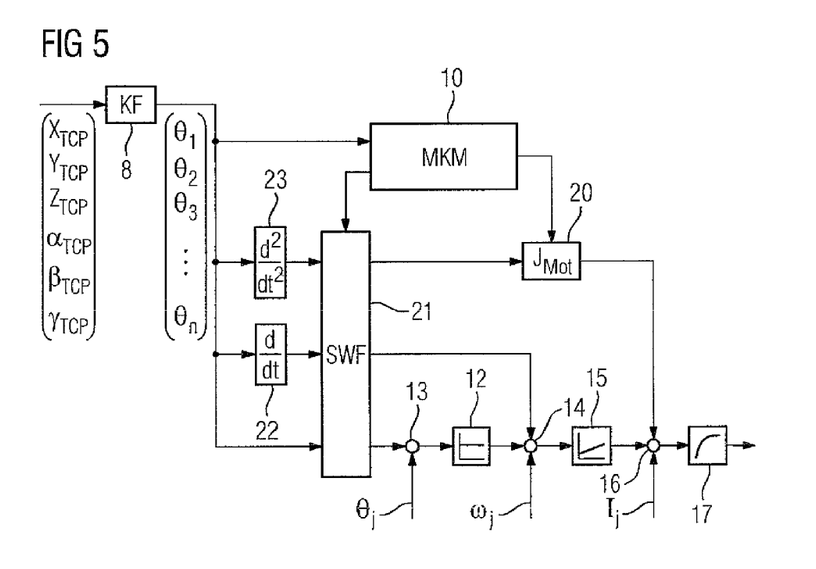
FIG. 5 shows a structural overview of the pilot control with a reference value filter.
Figure 6:
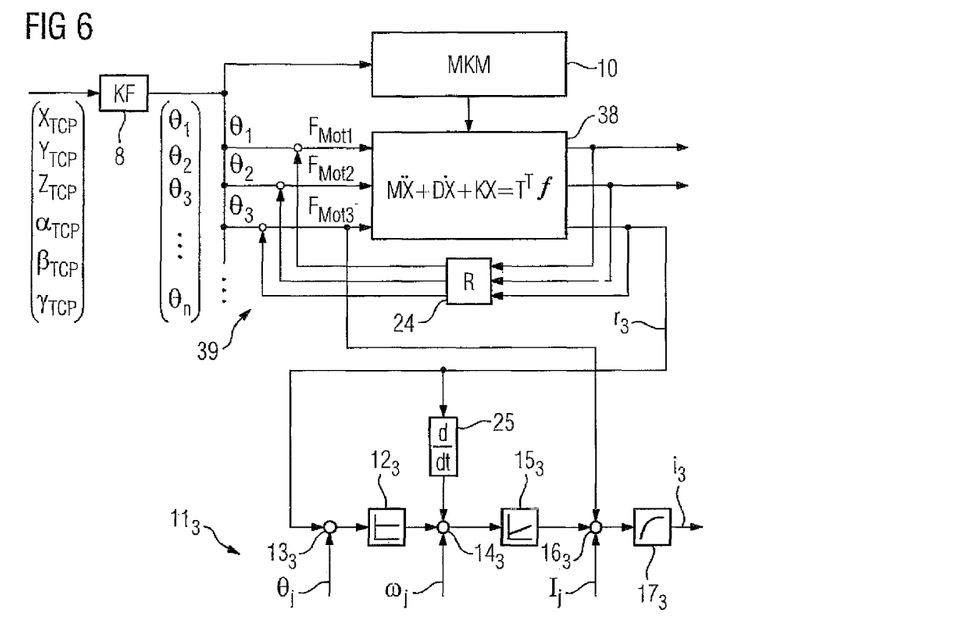
FIG. 6 shows a structural overview of the pilot control with a model-based state control.

Using the dynamic properties described by the model, the command variables may be adapted so that the excitation of the natural frequencies is prevented. Different methods may be used therefor:

positional reference value filter, the properties thereof being derived from the model (i.e. multi-element model) (for example zero settings; see FIG. 5) and layout of a multi-dimensional state control for the model and pilot control of the resulting control variables (see FIG. 6).

The illustration of FIG. 5 which shows a structural overview of a pilot control with a reference value filter, is again limited to one axis, for the sake of clarity. Similar to FIG. 4, the view of the load model 9 has been dispensed with. The remaining components shown in FIG. 5 with the same reference numerals as in the previous figures have the same functionality as in said figures. Therefore, reference is made to the respective description there.

In contrast to the previous embodiments, in this case a reference value filter 21 is provided (SWF). Said reference value filter obtains as an input signal not only positional information directly via the joint coordinates $\theta_1$ to $\theta_n$ but also by means of a differentiator 22 a speed signal formed therefrom and by means of a dual differentiator 23 an acceleration signal formed therefrom. From these three signals the reference value filter 21 forms a filtered acceleration signal which is supplied to the logic unit 20 which in turn provides the filtered acceleration signal with the total axial inertia $J_{Mot}$ provided by the multi-element model 10, and a corresponding result to the adder 16 for the current control as a command variable. In addition to this pilot control of the current, for the current control, the speed control is pilot controlled by a filtered speed signal, which the reference value filter 21 obtains from the easily differentiated joint coordinates. To this end, the filtered speed signal is input into the adder 14.

Finally, a pilot control and/or guidance of the position control takes place by a filtered position signal, which obtains the reference value filter 21 from the joint coordinates $\theta_1$ to $\theta_n$. This filtered position signal is supplied to the adder 13 as a command variable.

By means of the reference value filter 21, specific natural frequencies of the system may be filtered out depending on the position, i.e. in each case at the current time during acceleration. Thus, for example, the natural frequencies of a robot alter if it changes its arm position. In the extended state of the arm, the natural vibrations are slower than in the retracted state of the arm. Therefore, even during a movement it is possible to react in advance to the natural frequencies of the robot. Thus, for example, frequencies at 15 Hz are filtered out if the robot has extended the arm and frequencies at 17 Hz are filtered out if the arm adopts an intermediate position, and frequencies of 20 Hz are filtered out if the arm is retracted.

A further possibility for adapting the command variables is shown in the exemplary embodiment of FIG. 6. Here the system is also simplified as in FIG. 5. For adapting the command variables in this case a model 38 of the path is implemented in the system. The model 38 is based, for example, on the same linear differential equation system as the multi-element model 10. This model 38 of the path is embedded in a control circuit 39, which in this case is illustrated for all three axes and has a controller 24 in the feedback branch. The control circuit 39 results in an ideally controlled path, the control variable $r_3$ (in FIG. 6 only that of the third axis of the n axes being illustrated) thereof being used as a command variable for the control unit 11₃. To this end, it is input into the adder 13₃ for the position control. The result of the adder 13₃ is forwarded to the PI-controller 12₃, the result thereof in turn being forwarded to the adder 14₃ of the speed control. A differentiator 25 produces from the control variable $r_3$ a speed signal which is also supplied to the adder 14₃. After summation using the correct arithmetic sign, the summated signal is supplied to the PI-controller 15₃ of the speed control, the output signal thereof being forwarded to the adder 16₃ of the current control. The control variable $F_{Mot3}$ of the ideal control path and/or of the model 38 is additionally forwarded in this adder 16₃. Moreover, the axis-specific actual values $\theta_j$, $\omega_j$ and $I_j$ are supplied to the adders 13₃, 14₃ and 16₃. The summated signal of the adder 16₃ is finally supplied to the current controller 17₃, from which the resulting current signal $i_3$ for the third axis is produced. Structurally, the same control units as the control unit 11₃ may be provided for the remaining n−1 axes. For the sake of clarity, however, they are not shown in FIG. 6.

In addition, it should be noted that the multi-element model 10 in each case delivers the currently applicable matrices M, D and K to the model 38.

Moreover, the variables fed back into the ideal control 39 together with the joint coordinates are linked to the control variables of the control path $F_{Mot1}$, $F_{Mot2}$, $F_{Mot3}$ to $F_{Motn}$, which in each case represent forces.

A model of the actual path may, therefore, be used in order to carry out an adaptation of the command variables of the actual control unit for reducing the excitation of the natural frequencies.

By considering all anticipated loading cases and the use of a correct torque pilot control a suitable estimate of the motor torques is always available, which may be used further for monitoring purposes. A significant deviation of the measured motor torque and/or actual current value $I_i$ from the calculated motor torque which is emitted by the control path and/or the model 38, would indicate an unexpected event (for example a collision). The model 38 may, therefore, also be used for monitoring the motor torques, in addition to adapting the command variables.

Figure 7:
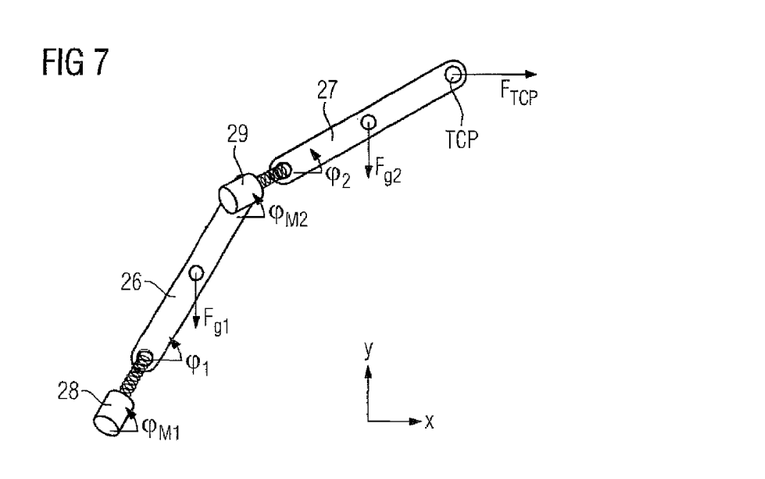
FIG. 7 shows a simulation example with a 2D robot.

FIG. 7 shows a practical example of a 2D robot by which the possibilities and advantages of the invention may be illustrated. The sketched 2D robot in this case has two arms 26 and 27 which in each case may be moved by a motor 28, 29. At the free end of the second arm 27 is located the TCP. A force $F_{TCP}$ acts thereon, in this case in the horizontal direction. Moreover, a weight force $F_{g1}$ is exerted on the first arm 26 and a weight force $F_{g2}$ is exerted on the second arm.

Generally each of the four elements 26 to 29 has six degrees of freedom. As this is a two-dimensional mechanical problem, three coordinates per element are sufficient for the full description. The kinematics also form the basis of the following constraints:

the arm 26 is rotatably mounted relative to the substructure.

the arm 27 is rotatably mounted relative to the arm 26.

the motor 28 may only rotate relative to the substructure.

the motor 29 is moved with the arm 26 and may only rotate relative to the arm 26.

The positional conditions limit the possibilities of movement and are formulated as linear dependencies between the degrees of freedom. Thus the 2D robot has only four independent movement variables. This is exceptionally clear in FIG. 7 if the angular positions $\varphi_{M1}$, $\varphi_{M2}$ of the motors 28 and 29 and the angular positions $\varphi_1$, $\varphi_2$ of the arms 26 and 27 are predetermined.

The TCP (Tool Center Point) is the relevant point of reference for the movement. The coordinate transformation between the Cartesian position of the TCP and the positions of the arms is as follows:

$$\begin{bmatrix} x_{TCP} \\ y_{TCP} \end{bmatrix} = \begin{bmatrix} l_1\cos(\varphi_1) + l_2\cos(\varphi_1 + \varphi_2) \\ l_1\sin(\varphi_1) + l_2\sin(\varphi_1 + \varphi_2) \end{bmatrix}$$

Similarly, the kinematic relations for other designated points may be established, for example for the points of gravity of the elements or the moving rotary joint. In a linearized view (Jacob matrix) these form the inputs of the transformation matrix T for converting the coordinates.

The linearization of the mechanical equations takes place at a given operating point. This reference position is "fixed" for the torque. The state vector X, therefore, contains the deflection of the structure from this operating point.

The motors and the arms are ideally not rigidly connected but via a resilient spring which models the resilience of the drive trains. Therefore, a stiffness matrix K may be provided for an operating point, which describes the restoring torques of the springs as a linear reaction to a deflection X.

The drive torques of the motors, the weight forces of the elements and optionally also additional force at the TCP act on the structure. Thus the described equation system is complete. It describes the connections between movement and forces.

If no external forces act, the springs are relaxed in a stationary manner and the angular positions of the motor and arm are in each case equal. If forces act (for example gravity $F_{g1}$ and $F_{g2}$ or an external force $F_{TCP}$) the springs are deflected and the angular positions $\varphi_{M1}$ and $\varphi_{M2}$ of the motors 28 and 29 as well as the angular positions $\varphi_1$ and $\varphi_2$ of the arms 26 and 27 are unequal.

Figure 8:
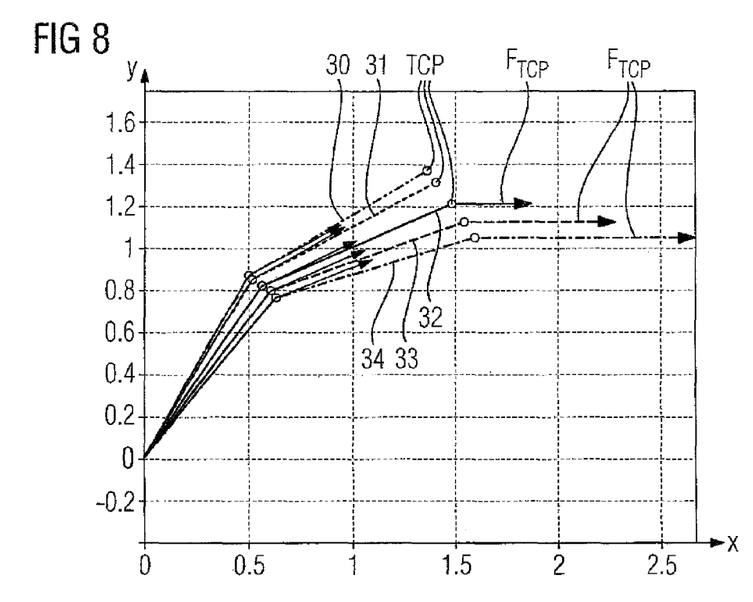
FIG. 8 shows the deflection of the robot of FIG. 7 according to the prior art.

FIG. 8 shows the results of simulation calculations and how the position of the robot of FIG. 7 is set according to a control method according to the prior art (control of the motor position, no compensation). The reference position is in each case $\varphi_1=60°$ and $\varphi_2=-30°$. The robot is at its most upright according to the line 30 in the y-direction, if no gravity and no external force act at the TCP. The lines 31, 32, 33 and 34 indicate the positions of the 2D robot in the case of gravity (in the negative y-direction) and different values for the external force $F_{TCP}$ at the TCP (size=length of respective force arrow).

It may be seen clearly how the structure of the robot flexes when influenced by external forces. The two motors remain in each case at the same position while the arms move.

Figure 9:
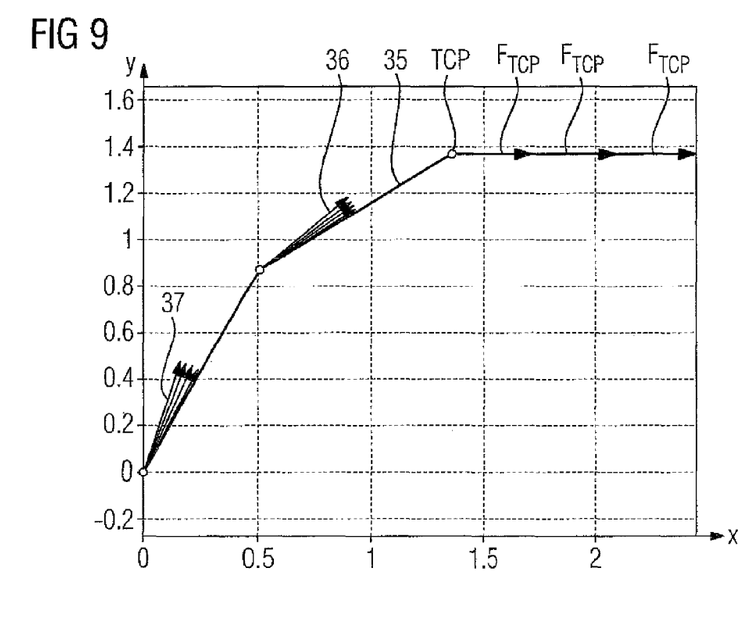
FIG. 9 shows the deflection of the robot of FIG. 7 with the model-based force compensation according to the invention.

FIG. 9 shows the results of simulation calculations and how the position of the robot of FIG. 7 is set according to the method of the present invention. The reference position is once again $\varphi_1=60°$ and $\varphi_2=-30°$. The line 35 shows the position of the 2D robot in the case of gravity and different values for an external force at the TCP. The robot does not alter its position due to the dynamic control according to the invention, and not even if the force $F_{TCP}$ alters.

The above developed equation system for the movements and the forces may optionally be changed according to the forces (with a given movement) or according to displacement (with given forces and torques). The number of independent variables, however, is in any case the same (in this case four). The method according to the invention preferably evaluates the equation system such that a portion of the movement coordinates (in this case the position of the TCP) and a portion of the acting forces are predetermined and specifically initiated according to the remaining free variables (in this case the torque and deflection of the motors).

As has already been indicated above, FIG. 9 illustrates that the structure does not move under the influence of external forces. The two motors compensate for the deflection, by clamping the resilient drive trains to the required extent (fanned-out arrows 36 and 37). The two arms in each case remain at the same position.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An apparatus for controlling and regulating a movement of a system comprising a plurality of individual elements which cooperate kinematically, with at least one of the individual elements being movable by a drive, said apparatus comprising:

a load calculating device calculating continuously during the movement of the system a respective force vector for each of the individual elements as a function of predetermined reference coordinates;

a torque calculating device calculating continuously during the movement at least one compensating variable as a function of the predetermined reference coordinates and the force vector, said compensating variable compensating the respective force vectors, said compensating variable being selected from one of the group consisting of compensating torque, a compensating force, a compensating speed and a compensating position;

a control unit controlling continuously during the movement a force-producing variable for the at least one drive as a function of the reference coordinates and the at least one compensating variable; and a model of a control path of the system, wherein the model is configured to calculate at least one ideal command variable for the drive or an ideal torque of the drive for monitoring an actual torque of the drive.

2. The apparatus of claim 1, wherein the compensating variable is a member selected from the group consisting of a compensating torque, a compensating force, a compensating speed and a compensating position.

3. The apparatus of claim 1, wherein the load calculating device uses a load model for calculating the respective force vector, said load model considering at least one of a point, a direction, arid an amplitude of an introduction of force in one of the individual elements.

4. The apparatus of claim 1, wherein the control unit has a cascaded position control, a speed control and one of from the group consisting of a pressure control and a current control.

5. The apparatus of claim 1, wherein the torque calculating device uses a multi-element model for calculating an at least one compensating torque, said multi-element model considering at least one of a mass, a resilience, a damping, and a linear dependence on degrees of freedom of each of the respective individual elements.

6. The apparatus of claim 5, wherein the multi-element model is based on a linear differential equation system.

7. The apparatus of claim 6, wherein the differential equation system is based on a mass matrix, a damping matrix and a stiffness matrix, in each case relative to the individual elements.

8. The apparatus of claim 5, wherein the multi-element model considers at least one of inertial forces and centrifugal forces respectively acting on the individual elements.

9. The apparatus of claim 1, wherein the torque calculating device is configured to continuously calculate during the movement a maximum acceleration of one of the individual elements or a combination of a plurality of individual elements.

10. The apparatus of claims 1, wherein the torque calculating device and the control unit are configured to continuously reduce an excitation of at least one natural frequency of the system during the movement.

11. A method for controlling and regulating a movement of a system comprising a plurality of individual elements which cooperate kinematically, at least one thereof being moved by a drive, said method comprising:

calculating with a load calculating device continuously during the movement of the system a respective force vector for each of the individual elements as a function of predetermined reference coordinates;

calculating a torque calculating device continuously during the movement of the system at least one compensating variable compensating the force vectors based on the reference coordinates and the force vectors, said compensating variable being selected from one of the group consisting of compensating torque, a compensating force, a compensating speed and a compensating position;

controlling a control unit controlling continuously during the movement of the system a force-producing variable for the at least one drive depending on the reference coordinates and the at least one compensating variable; and calculating with a model at least one ideal command variable for the drive or an ideal torque of the drive of a control path of the system, for monitoring an actual torque of the drive.

* * * * *